Figure 1:
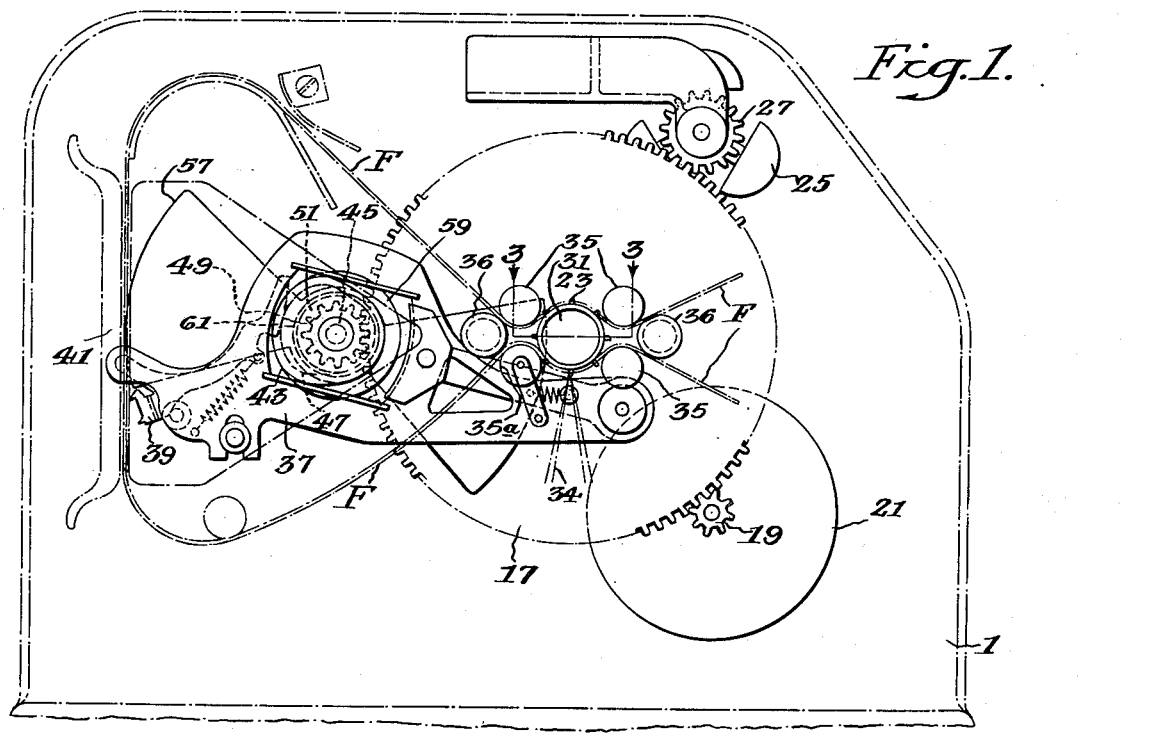

Nov. 9, 1937.  C. N. BATSEL  2,098,700
COMBINED SOUND AND PICTURE APPARATUS
Filed July 26, 1935

Inventor
Cecil N. Batsel
by T. R. Goldsborough
Attorney

Patented Nov. 9, 1937

2,098,700

UNITED STATES PATENT OFFICE 2,098,700

COMBINED SOUND AND PICTURE APPARATUS

Cecil N. Batsel, Haddon Heights, N. J., assignor to Radio Corporation of America, a corporation of Delaware Application July 26, 1935, Serial No. 33,257

17 Claims. (Cl. 271—2.3)

This invention relates to combined sound and picture apparatus, and more particularly to the means in such apparatus for advancing a film therethrough, the present invention being an improvement upon that disclosed in my copending application, Ser. No. 19,034.

In said copending application, I have shown a combined picture projecting and sound reproducing machine in which a photographic film is fed to and from the film magazine by a single sprocket located at the sound translating station and constituting also the drum around which the film is passed at said station. A flywheel on the drum or sprocket shaft and a friction controlled fly ball governor geared directly to the sprocket serve to control the rotation thereof to impart uniform motion thereto. While an arrangement of this sort is quite satisfactory in that it provides constant speed of the sprocket, it does not avoid flutters in the sound caused by sprocket tooth action and other flutters resulting from speed irregularities of the film caused by uneven motion of the film itself.

In order to eliminate, or, at least, to minimize irregularities in the motion of the film, it is desirable to have the film act as if it were a heavy mass, whereby it would resist the forces which normally produce irregularities in its motion. This can be accomplished, for example, by securing a flywheel to the sprocket or drum shaft, as shown in my aforesaid copending application. However, even if the film is so provided with a flywheel, it is not expedient to hold the film against the sprocket drum (for example, by means of a pressure roller) because the sprocket holes and the drum invariably will not feed the film past the light slit at the same linear rate.

The primary object of my invention is to provide an improved film feeding mechanism, in combined sound and picture apparatus of the type specified, which will avoid the foregoing difficulty.

More specifically, it is an object of my present invention to provide an improved film feeding mechanism, in either sound recording or sound reproducing apparatus, by means of which the film can be advanced at the sound translating station with such uniformity or constancy of speed that any variations that may occur therein will not be noticeable during reproduction of sound from the film.

Another object of my invention is to provide an improved film feeding mechanism of the type specified whereby the film is supplied with the necessary inertia at the sound translating station independently of the sprocket which advances it and, therefore, independently of any variations in the teeth of the sprocket.

A further object of my invention is to provide an improved film feeding mechanism of the type set forth which will be extremely simple in construction, which can be easily and quickly assembled, and which is highly efficient in use.

In accordance with my present invention, and in order to retain the advantages involved in the extremely simple construction using a single sprocket while adding the advantage of having the film act as a heavy mass at the sound translating station, I make the sprocket and the drum of separate members and mount them concentrically in adjacent relation for independent rotation. The sprocket is driven, as in the construction of my aforesaid copending application, from a motor through suitable gearing and its rotation is controlled by a suitable governor, while the drum is provided with a flywheel to insure uniform motion thereof. The film is held against the drum in non-slipping relation therewith whereby the mass or inertia of the flywheel is imparted to the film, the sprocket serving, of course, to feed the film past the scanning light. This construction permits reproduction of sound which is free from sprocket tooth gurgles and other fluttering sounds that are so much in evidence when the extremely light weight film is passed over the sprocket. It also insures the film being held more firmly against the sprocket teeth, thereby reducing troubles encountered by the film take-up mechanism pulling the film over the sprocket.

Figure 2:
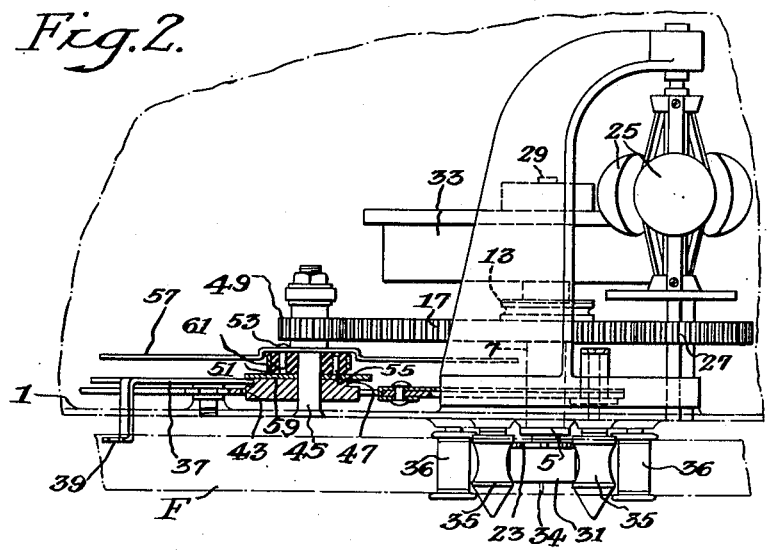
Figure 3:
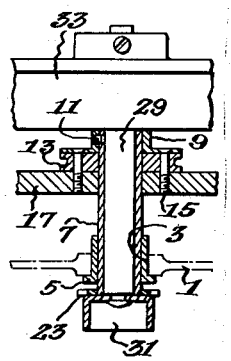

The novel features that I consider characteristic of my invention are set forth with particularity in the appended claims. The invention itself, however, both as to its organization and method of operation, together with additional objects and advantages thereof, will best be understood from the following description of a specific embodiment, when read in connection with the accompanying drawing, in which Figure 1 is a front elevation, with the casing removed, of a sound-picture projector incorporating my invention, Figure 2 is a top elevation thereof, and Figure 3 is a detail, sectional view taken on the line 3—3 of Figure 1.

Referring more specifically to the drawing, wherein similar reference characters indicate corresponding parts throughout, there is shown a supporting member in the form of an upstanding plate 1, apertured at 3 for the reception of a fixed bushing 5. Within the bushing 5 is rotatably mounted a second bushing or sleeve 7 to which is fixed, by means of a flanged collar 9, a set screw 11, a pulley 13 and a plurality of bolts or the like 15, a gear 17 which receives power from the driving gear 19 of a motor 21. A disc-like sprocket 23 having a single row of teeth and fixed to the bushing 7 serves to feed a perforated film strip F through the apparatus from and back toward a film magazine (not shown), the pulley 13 being belted to the take-up reel in the magazine, while a friction controlled fly ball governor 25, coupled to the gear 17 by a gear 27, serves to control the speed of the sprocket 23.

Carried by the rotatable bushing 7 for free rotation therein is a shaft 29 to one end of which is fixed a film support in the form of a hollow drum 31 constituting the sound translating station, and to the other end of which is fixed an inertia member or flywheel 33. As will be noted in Figure 3, the sprocket 23 and the drum 31 are concentric with each other, and the drum 31, which is narrower than the film strip F, is located immediately adjacent the sprocket 23 and may, if desired, actually be in engagement therewith, the teeth of the sprocket 23 extending slightly beyond the periphery of the drum 31. When the film F is threaded on the sprocket 23, its edge opposite to the threaded edge will extend beyond the end of the drum 31 most remote from the sprocket 23 for the interruption of the scanning beam 34. For maintaining the film F in engagement with the sprocket 23 over a substantial arc thereof, I provide a plurality of rollers 35 and 36, staggered with respect to the sprocket. One of the rollers, such as 35a, is spring pressed against the drum 31 to hold the film F in non-slipping engagement with the drum and, as the sprocket 23 draws the film F over the drum 31, the friction between the film and the drum will cause the drum, and with it the flywheel 33, to rotate. Thus, the flywheel serves to impart inertia to the film at the sound translating station whereby its motion at said station is maintained uniform.

Pivotally mounted on the supporting plate 1 is an intermittent mechanism generally designated by the numeral 37 and including a pivotally mounted claw 39 which is adapted to draw the film F intermittently through a film gate 41. A cam 43 on a stub shaft 45 imparts vertical movement to the intermittent mechanism, the cam 43 having an integral, reduced portion constituting a second cam 47 which imparts movement to the claw 39 in a horizontal direction to engage and disengage the film F at proper intervals. Power is transmitted from the gear 17 to the cams 43—47 through a gear 49 on the stub shaft 45 and a rubber or other resilient disc 51 which is perforated to receive a pair of oppositely extending pins 53 and 55, the former of which is rigid with a light shutter 57 fixed to the shaft 45 and the latter of which is fixed to a plate or disc 59 brazed or otherwise secured to the cams 43—47. A ring 61 is preferably placed around the resilient disc 51 to keep it from swelling and, by reason of this resilient disc, irregularities in the movement of the intermittent mechanism are prevented from travelling back to the sprocket 23 through the gears 49 and 17 and associated intervening parts.

From the foregoing description, it is believed that the operation of my invention will be apparent. By separating the drum 31 from the sprocket 23 and making the two independently rotatable, that portion of the film which is in engagement with the drum 31 at the translation point acquires the inertia of the flywheel as the sprocket pulls it over the drum since the film has non-slipping engagement with the drum 31. Any variations in the teeth of the sprocket 23 will not, therefore, affect the motion of the film, and consequently the so-called sprocket tooth gurgles will be eliminated from the reproduced sound.

Although I have shown and described but one specific embodiment of my invention, I am fully aware that many modifications thereof are possible. For example, instead of mounting the flywheel 33 directly on the shaft 29, it may be coupled thereto through suitable gearing, as by a suitable gear reduction mechanism. Many other changes will, no doubt, readily suggest themselves to those skilled in the art. I desire, therefore, that my invention shall not be limited except insofar as is necessitated by the prior art and by the spirit of the appended claims.

I claim as my invention:

1. In phonographic apparatus, the combination of a rotary film support at the sound translating station and means concentric with said film support and rotatable independently of said support for a feeding a film thereover, said feeding means and said support being arranged to coact with the film along adjacent portions thereof transversely of the film.

2. In phonographic apparatus, the combination of a rotary film support at the sound translating station, means for holding a film in non-slipping engagement with said support, an inertia member associated with said support for imparting inertia to the film, and means concentric with said support for feeding the film thereover, said feeding means and said support being arranged to coact with the film along adjacent portions thereof transversely of the film.

3. In phonographic apparatus, the combination of a rotary drum at the sound translating station, means for holding a film in non-slipping engagement with said drum, an inertia member associated with said drum for imparting inertia to the film, and rotary film advancing means concentric with said drum for feeding the film thereover, said film advancing means and said drum being arranged to coact with the film along adjacent portions thereof transversely of the film.

4. In phonographic apparatus, the combination of a rotary drum at the sound translating station, means for holding a film in non-slipping engagement with said drum, an inertia member associated with said drum for imparting inertia to the film, and rotary film advancing means concentric with said drum and rotatable independently of said drum for feeding the film thereover, said film advancing means and said drum being arranged to coact with the film along adjacent portions thereof transversely of the film.

5. In phonographic apparatus, the combination of a rotary drum at the sound translating station, means including at least one roller associated with said drum for holding a film in non-slipping engagement therewith, an inertia member associated with said drum for imparting inertia to the film, and rotary film advancing means concentric with said drum and rotatable independently thereof for feeding the film thereover, said film advancing means and said drum being arranged to coact with the film along adjacent portions thereof transversely of the film, 6. In phonographic apparatus employing a perforated film strip, the combination of a rotary drum at the sound translating station, a sprocket concentric with said drum and rotatable independently thereof for feeding said strip thereover, a plurality of rollers adjacent said drum in somewhat staggered relation thereto for holding said strip in snug engagement with said sprocket over a substantial arc thereof, said rollers including a spring pressed roller for holding said strip in non-slipping engagement with said drum, and a flywheel associated with said drum for imparting inertia to said strip.

7. In phonographic apparatus, the combination of a supporting member, a pair of rotatable members carried by said supporting member in nested relation, said rotatable members being rotatable relative to said supporting member and independently rotatable relative to each other, film feeding means on one of said rotatable members, and a film support on the other of said rotatable members, said film feeding means being adapted to feed a film over said film support.

8. In phonographic apparatus, the combination of a supporting member, a bushing rotatably carried by said member, film feeding means on said bushing, a shaft mounted for rotation within said bushing, and a film drum fixed to said shaft and rotatable therewith independently of said film feeding means, said film feeding means being adapted to feed a film over said drum.

9. In phonographic apparatus, the combination of a supporting member, a bushing rotatably carried by said member, a sprocket fixed thereto for feeding a perforated film strip through said apparatus, a shaft mounted for rotation within said bushing, a film drum fixed to said shaft and rotatable therewith independently of said sprocket, and a flywheel fixed to said shaft and rotatable therewith for imparting inertia to said film strip.

10. The invention set forth in claim 9 characterized in that said sprocket and said drum are concentric with each other, and characterized further in that said sprocket is located immediately adjacent said drum.

11. The invention set forth in claim 9 characterized in that said sprocket and said drum are concentric with each other, and characterized further in that said sprocket is mounted immediately adjacent said drum with the teeth of said sprocket extending slightly beyond the periphery of said drum.

12. In phonographic apparatus, the combination of a supporting member, a sprocket rotatably carried thereby and adapted to feed a perforated film strip through said apparatus, a motor, means coupling said motor to said sprocket for transmitting power thereto, means associated with said coupling means for controlling the speed of said sprocket, a film drum operatively associated with said sprocket for supporting the film strip as it is fed by said sprocket, means for holding said film strip in non-slipping engagement with said drum, and an inertia member operatively associated with said drum for imparting inertia to said film as it passes over said drum.

13. In phonographic apparatus, the combination of a supporting member, a sprocket rotatably carried thereby and adapted to feed a perforated film strip through said apparatus, a motor, means coupling said motor to said sprocket for transmitting power thereto, means associated with said coupling means for controlling the speed of said sprocket, a film drum operatively associated with said sprocket for supporting the film strip as it is fed by said sprocket, said drum being concentric with said sprocket, means for holding said film strip in non-slipping engagement with said drum, and an inertia member operatively associated with said drum for imparting inertia to said film strip as it passes over said drum.

14. In phonographic apparatus, the combination of a supporting member, a bushing rotatably carried thereby, a sprocket fixed to said bushing and rotatable therewith for feeding a perforated film strip through said apparatus, a motor, means coupling said motor to said bushing for transmitting power thereto, means associated with said coupling means for controlling the speed of said sprocket, a shaft rotatably carried by said bushing, a film drum fixed to said shaft adjacent said sprocket and adapted to support a film strip fed by said sprocket, means for holding said film strip in non-slipping engagement with said drum, and an inertia member fixed to said shaft for imparting inertia to said film strip as it passes over said drum.

15. In phonographic apparatus, the combination of a supporting member, a bushing rotatably carried thereby, a sprocket fixed to said bushing and rotatable therewith for feeding a perforated film strip through said apparatus, a motor, means including a gear fixed to said bushing coupling said motor to said sprocket for transmitting power thereto, a governor geared to said gear for controlling the speed of said sprocket, a shaft rotatably carried by said bushing, a film drum fixed to said shaft immediately adjacent said sprocket and adapted to support a film strip fed by said sprocket, means for holding said film strip in non-slipping engagement with said drum, and a flywheel fixed to said shaft for imparting inertia to said film strip as it passes over said drum.

16. The invention set forth in claim 15 characterized in that the sprocket and the drum are concentric with each other and characterized further in that the teeth of said sprocket extend slightly beyond the periphery of said drum.

17. The invention set forth in claim 15 characterized in that the drum is narrower than the film strip and characterized further in that the sprocket has only one row of teeth, said sprocket being in engagement with one end of the drum whereby, when the film is threaded on the sprocket teeth, its opposite edge extends beyond the unengaged end of said drum.

CECIL N. BATSEL.